(12) United States Patent
Gertel et al.

(10) Patent No.: US 6,634,811 B1
(45) Date of Patent: Oct. 21, 2003

(54) HIGH PERFORMANCE OPTICAL LINK

(75) Inventors: Eitan Gertel, North Wales, PA (US); Mark Colyer, Fountainville, PA (US)

(73) Assignee: JDS Corporation, San Jose, CA (US)

( * ) Notice: Subject to any disclaimer, the term of this patent is extended or adjusted under 35 U.S.C. 154(b) by 0 days.

(21) Appl. No.: 09/451,417

(22) Filed: Nov. 30, 1999

(51) Int. Cl.[7] .............................................. H04B 10/00
(52) U.S. Cl. ...................... 398/159; 398/187; 398/141
(58) Field of Search ................................ 359/182, 188, 359/124, 189; 398/187, 150, 159, 141, 200

(56) References Cited

U.S. PATENT DOCUMENTS

| 5,305,134 A | * | 4/1994 | Tsushima et al. | ............ | 359/192 |
| 5,940,196 A | | 8/1999 | Piehler et al. | .............. | 359/133 |
| 6,014,243 A | * | 1/2000 | Saeki | ......................... | 359/278 |

FOREIGN PATENT DOCUMENTS

| EP | 0403991 A2 | 12/1990 |
| EP | 0528225 A2 | 2/1993 |

OTHER PUBLICATIONS

Helkey, Roger. "Relative–Intensity–Noise Cancellation in Bandpass External–Modulation Links." IEEE Transactions on Microwave Theory and Techniques, vol. 46, No. 12, Dec. 1998, pp. 2083–2091.*

* cited by examiner

Primary Examiner—Jason Chan
Assistant Examiner—Christina Y Leung
(74) Attorney, Agent, or Firm—Allen, Dyer, Doppelt, Milbrath & Gilchrist, P.A.

(57) ABSTRACT

An optical link is described for transmission of an RF signal using an optical fiber having opposing ends and configured such that unwanted distortion signals are produced when optical signals pass through the optical fiber. At least first and second optical signals are transmitted through the optical fiber, where the optical signals have been modulated with an RF signal in such a way that a predetermined relationship is produced between the RF signals modulated on the first and second optical signals. At the opposing end of the optical fiber, a receiving arrangement receives the modulated first and second optical signals including the unwanted distortion signals produced during the transmission through the optical fiber. The receiving arrangement then regenerates the RF signal from the modulated first and second optical signals while causing the unwanted distortion signals to be canceled based on the predetermined relationship between the RF signals modulated on the first and second optical signals.

17 Claims, 3 Drawing Sheets

HIGH PERFORMANCE OPTICAL LINK

BACKGROUND OF THE INVENTION

The present invention relates generally to high performance optical links and, more particularly, to an optical link that utilizes optical carriers transmitted using a single transmission medium such as an optical fiber in a way which substantially eliminates unwanted distortion signals accumulated during the transmission process.

Optical links early in the development of communication systems using a light transmission medium such as, for example, an optical fiber were based on a single optical carrier of a specific wavelength. FIG. 1 illustrates one such example. An optical link, generally indicated by the reference number 10, shown in FIG. 1 utilizes an optical light source 12 of a selected wavelength $\lambda_1$ to produce an optical carrier 14. The specific wavelength was chosen to fall within one of the transmissive windows in the typical optical fiber absorption spectrum. An RF signal 16 is modulated onto the optical carrier 14 using a modulator 18. A modulated optical signal 20 is then directed into an optical fiber 22. Optical devices, such as an optical amplifier 24, may be spliced into optical fiber 22. Modulated optical signal 20 is received at the other end of optical fiber 22 by a receiver 26, and, thereafter, the RF signal is regenerated as an $RF_{out}$, signal 28.

While prior art optical link 10 is generally suited to its intended purpose, a number of disadvantages have been discovered. The main disadvantages of the single wavelength, single fiber optical link are its relatively limited data capacity and significant data signal degradation. This degradation is due at least in part to optical carrier intensity attenuation and/or composite second order (CSO) noise accumulation during transmission through the optical fiber.

One prior art approach in an attempt to improve data transfer uses multiple optical carriers. However, in an optical link, the number of distinct sets of data which can be transmitted through a single optical fiber on multiple optical carriers is limited by the fact that, if portions of the RF signals modulated onto the optical carriers overlap, those portions will cancel each other and result in crosstalk, or significant reductions in the data fidelity. Hence, only a limited number of distinct data can be transmitted using this optical link scheme. Moreover, when optical amplifiers are inserted into the transmission medium in an attempt to alleviate the attenuation problem, the accumulated noise is amplified along with the optical carrier. For this reason, the carrier-to-noise (CNR) ratio is not improved with the addition of optical amplifiers in a single wavelength, single fiber optical link or in a multiple wavelength, single fiber optical link.

Another prior art attempt in resolving the foregoing problems has been to use a modulator having dual outputs directed into two optical fibers. Now referring to FIG. 2, this dual fiber optical link is generally indicated by the reference number 30. In this dual fiber optical link 30, as in previously described single wavelength, single fiber optical link 10, single laser source 12 is used and single optical carrier 14 is directed into a modulator 32. However, optical carrier 14 is split into first and second optical signals 34 and 36 after RF modulation signal 18 is encoded thereon. Modulator 32 is designed such that RF modulation 18 on first optical signal 34 and RF modulation 18 on second optical signal 36 emitted at the output ports 1 and 2, respectively, have a predetermined relationship. For example, the RF modulation on first optical signal 34 and the RF modulation on second optical signal 36 can be manipulated to be 180° out of phase at the two output ports of modulator 32. Note that optical signals 34 and 36 at the output ports 1 and 2, respectively, are of the same wavelength while the RF modulation on first optical signal 34 is the exact reciprocal of the RF modulation on second optical signal 36. Therefore, unless optical signals 34 and 36 are transmitted on two separate optical fibers 38 and 40, the RF modulation on optical signals 34 and 36, being exactly out of phase, will cancel out and the encoded information will be lost.

Still discussing dual fiber optical link 30 shown in FIG. 2, at the receiving end of optical fibers 38 and 40, the RF modulation signals, as affected by the noise accumulation during transmission, are recovered from optical signals 34 and 36 by separate detectors 46 and 48, respectively. The CSO on each of the two recovered RF signals is in phase with respect to one another since the noise was accumulated during the transmission process, while the RF signals themselves are 180° out of phase, as dictated by the characteristics of modulator 32. Recovered RF signals 50 and 52 are combined using a 180° combiner, in which one of the recovered RF signals, as affected by the noise accumulation, is sent through a 180° phase compensator (not shown) then added to the other recovered RF signal, also as affected by the noise accumulation, such that the CSO on the two recovered RF modulation signals is now 180° out of phase so as to substantially cancel when added. Furthermore, the recovered RF signals themselves are in phase as a result of the 180° phase compensator. Thus, the total RF signal at the destination is increased by a factor of two as compared to single wavelength, single fiber optical link 10. As a result, the CNR of dual fiber optical link 30 improves by 3 dB.

Although the CSO problem has been reduced, abovementioned dual fiber optical link 30 has a drawback in that two separate optical fibers 38 and 40 are required for the transmission of each data set. Two fibers may not be available for use between all data sources and receivers, and this fact will add to the infrastructure cost of using the dual fiber approach. With regard to proper operation of dual fiber optical link 30, a further problem is posed in the system architecture because in this case two matching sets of optical components are necessary between the data source and the destination. Such matching sets of optical fibers, optical amplifiers, and receivers may simply be unavailable. Moreover, the cost of building an optical communication infrastructure using this two fiber optical link is nearly twice as the cost of a single wavelength, single fiber optical link.

The present invention utilizes a highly advantageous and heretofore unseen optical link configuration and associated method using a single transmission medium which overcomes the foregoing limitations and disadvantages while still improving the CSO and CNR performance of the optical link.

SUMMARY OF THE INVENTION

As will be described in more detail hereinafter, there is disclosed herein a high performance optical link and associated method for transmission of an RF signal using a single transmission medium, such as an optical fiber having opposing ends and configured such that unwanted distortion signals are produced when optical signals pass through the optical fiber. At one end of the optical fiber, the optical link includes means for transmitting first and second optical signals through the optical fiber. The optical signals have been modulated with the RF signal in such a way that a predetermined relationship is produced between the RF signals modulated on the first and second optical signals. The opposing end of the optical fiber is equipped with an arrangement for receiving the modulated first and second optical signals, including the unwanted distortion signals produced during transmission through the optical fiber, and for regenerating the RF signal from the modulated first and second optical signals while causing the unwanted distortion signals to be canceled based on the predetermined relationship.

DETAILED DESCRIPTION OF THE INVENTION

Figure 3:
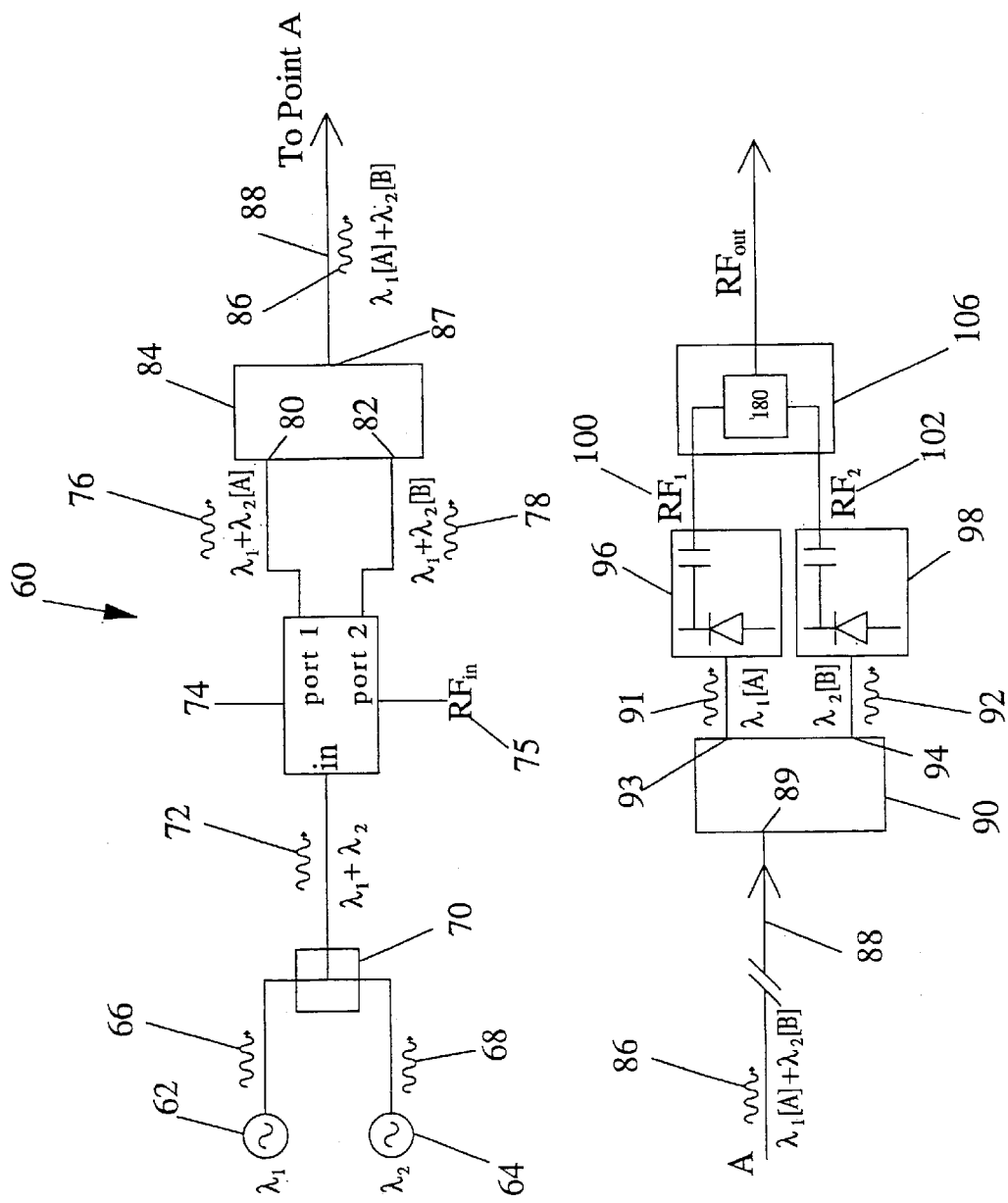
FIG. 3 is a block diagram of a high performance optical link manufactured in accordance with the present invention shown here to illustrate an embodiment using optical carriers of two wavelengths, a wavelength-division multiplexer and a wavelength-division demultiplexer.

Attention is now directed to FIG. 3, which illustrates one implementation of a high performance optical link, generally indicated by the reference number 60 and manufactured in accordance with the present invention. Optical link 60 includes two optical light sources 62 and 64, which emit first and second optical carriers 66 and 68 at first and second optical wavelengths $\lambda_1$ and $\lambda_2$, respectively. First and second optical carriers 66 and 68 are combined using a combiner 70, and directed to the input port of a Mach-Zender (MZ) modulator 74. RF signal 75, on which the original information to be transmitted is encoded, is modulated onto combined optical carrier 72 at MZ modulator 74 such that first and second optical signals 76 and 78 are produced at the output ports 1 and 2 of MZ modulator 74. First and second optical signals 76 and 78 each contain both first and second optical carriers 66 and 68 with optical wavelengths $\lambda_1$ and $\lambda_2$.

First and second optical signals 76 and 78 are modulated by the same RF signal 75, however, MZ modulator 74 is designed to produce a phase difference of 180° between the RF signal modulated onto first optical signal 76 and the RF signal modulated onto second optical signal 78. In other words, at the two MZ modulator output ports, the RF signal modulated onto first optical signal 76 is the exact complement of the RF signal modulated onto second optical signal 78. The phase of the RF signal modulated onto first optical signal 76 is indicated as [A], and the phase of the RF signal modulated onto second optical signal 78 is indicated as [B]. Optical signals 76 and 78 at the MZ modulator output ports are marked with wavelength indications $\lambda_1$ and $\lambda_2$ to signify that both of these optical wavelengths are present at each MZ modulator output port.

Continuing to refer to FIG. 3, first and second optical signals 76 and 78 are directed into first and second input channels 80 and 82, respectively, of a wavelength division multiplexer (WDM) 84. WDM 84 is designed to select first optical carrier 66, with optical wavelength $\lambda_1$ and phase [A], from first optical signal 76 at first input channel 80 and to select second optical carrier 68, with optical wavelength $\lambda_2$ and phase [B], from second optical signal 78 at second input channel 82. Then WDM 84 combines the selected optical signals 76 and 78 into a multiplexed signal 86 and transmits multiplexed signal 86 at an output channel 87. As a result, multiplexed signal 86 contains first optical carrier 66, with optical wavelength $\lambda_1$ and phase [A], and second optical carrier 68, with optical wavelength $\lambda_2$ and phase [B]. First and second optical carriers 66 and 68 have the same RF signal modulated thereon but with a phase difference of 180° between the RF signals on the two optical carriers.

Figure 2:
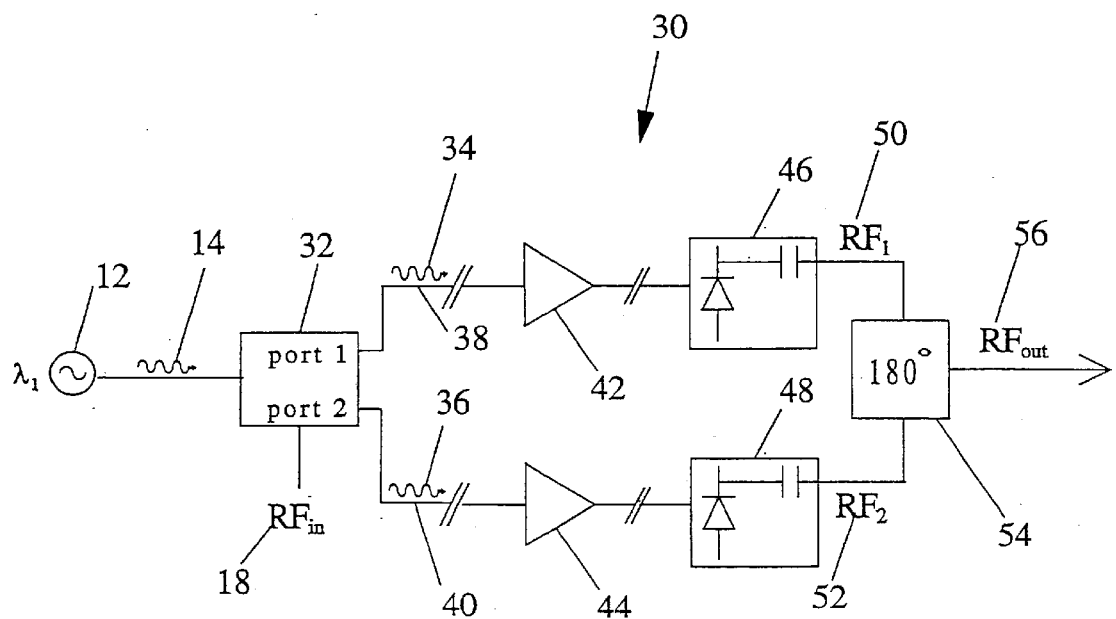
FIG. 2 is a block diagram of another prior art optical link which uses a dual fiber method to transmit the RF signal on two optical carriers through two optical fibers. Upon detection at two receivers, the received signals are added in such a way that the RF signal is regenerated while the unwanted distortion signals accumulated during transmission through the optical fibers are canceled.

Multiplexed signal 86 from output channel 87 of WDM 84 is directed into a single optical fiber 88. Unwanted distortion signals are accumulated on the multiplexed signal during transmission through optical fiber 88. As in prior art optical links 10 and 30, additional optical devices, such as optical amplifiers (not shown), may be inserted into optical fiber 88. However, it should be noted that, from output channel 87 of WDM 84 to a demultiplexing WDM 90 to be described hereinafter, only a single continuous transmission medium is required, unlike the prior art shown in FIG. 2.

Figure 1:
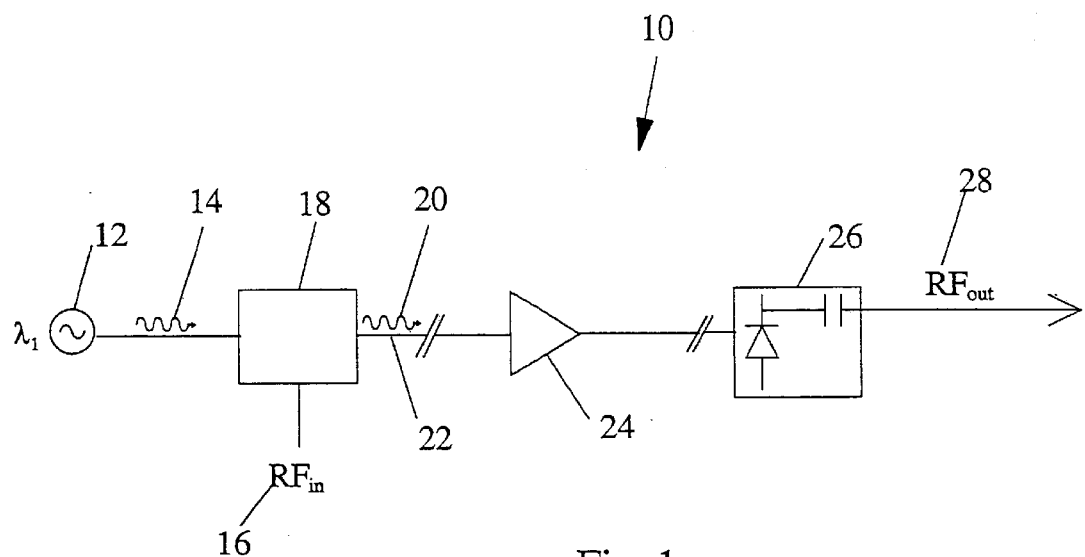
FIG. 1 is a block diagram of a prior art optical link which uses one light source of a single wavelength, one optical fiber as the transmission medium and one receiver for the detection and decoding of the RF signal.

At the opposing end of the optical fiber, multiplexed signal 86 is directed into an input channel 89 of a demultiplexing WDM 90. Demultiplexing WDM 90 separates multiplexed signal 86 into a first optical carrier 91, with optical wavelength $\lambda_1$ and phase [A], and a second optical carrier 92, with optical wavelength $\lambda_2$ and phase [B]. Separated optical carriers 91 and 92 exit from demultiplexing WDM 90 at first and second output channels 93 and 94, and are then directed to first and second receivers 96 and 98, respectively. RF signals 100 and 102, including the unwanted distortion signals, modulated on the separated first and second optical carriers 91 and 92 are recovered by first and second receivers 96 and 98, respectively. Recovered RF signals 100 and 102 are then recombined using a 180° combiner 106 in which the phase of one of the recovered RF signals, including the unwanted distortion signals, is shifted by 180° and the resulting phase shifted RF signal is added to the other, unshifted RF signal. The unwanted distortion signals accumulated on the phase shifted and unshifted RF signals then become 180° out of phase and thus cancel when added. Furthermore, the RF signals with the original information encoded thereon are brought back in phase by a 180° combiner 106, thus the original RF signal is regenerated. As a result, the CNR improves by 3 dB compared to the prior art shown in FIG. 1, and the CSO improvement will be between 6 and 12 dB.

It should be noted that the technique of the present invention can be achieved in other configurations such as, for example, one which uses a single light source and one transmission medium while incorporating the unwanted distortion signal cancellation scheme. Such an example is illustrated in FIG. 4, and the configuration is generally referred to by the reference number 130.

Figure 4:
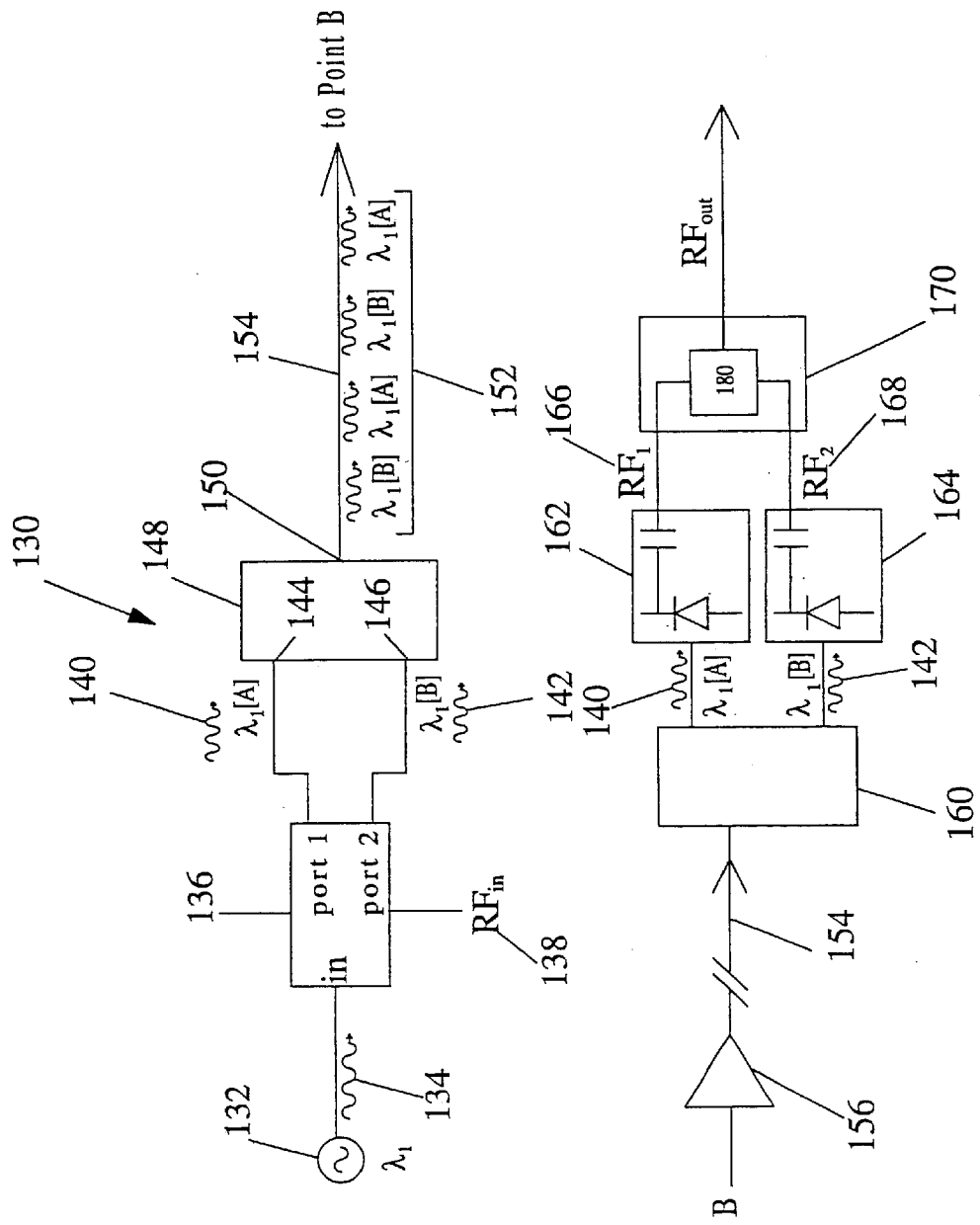
FIG. 4 is a block diagram of an alternative high performance optical link also manufactured in accordance with the present invention shown here to illustrate an embodiment using a time-division multiplexer and a time-division demultiplexer.

As can be seen in FIG. 4, a single light source 132 emits an optical carrier 134 with wavelength $\lambda_1$ which is directed into a modulator/splitter 136. An RF signal 138 is modulated onto optical carrier 134, which is then split into two optical signals 140 and 142 with a 180° phase difference produced between optical signals 140 and 142 at the modulator output Ports 1 and 2. Optical signals 140 and 142 on which RF signal 138 have been modulated with phase [A] and phase [B], respectively, are then directed into a time-division multiplexer (TDM) 148 which splits optical signals 140 and 142 into smaller information packets that are sent out of a TDM output port 150 in an alternating, sequential manner as a time-multiplexed signal 152, as shown schematically in FIG. 4, through a single optical fiber 154. As in the case of the optical link shown in FIG. 3, optical devices such as an optical amplifier 156 may be spliced into optical fiber 154.

Continuing to refer to FIG. 4, time-multiplexed signal 152 is received at the opposing end of optical fiber 154 by a demultiplexing TDM 160 which reconstructs optical signals 140 and 142 from the received time-multiplexed signal 152. The RF signals including the unwanted distortion signals are recovered from optical signals 140 and 142 using first and second receivers 162 and 164, respectively. The resulting RF signals 166 and 168 are added using a 180° combiner 170. As in the earlier embodiment of the invention illustrated in FIG. 4, the unwanted distortion signals then become 180° out of phase and thus cancel when added. The RF signals are brought back into phase by the 180° combiner, resulting in regeneration of the original RF signal. As in the case of the embodiment of the invention described earlier, the CNR improves by 3 dB compared to the prior art shown in FIG. 1, and the CSO improvement will be between 6 and 12 dB.

Since the optical link and associated method disclosed herein may be provided in a variety of different configurations and the method may be practiced in a variety of ways, it should be understood that the present invention may be embodied in many other specific ways without departing from the spirit or scope of the invention. Therefore, the present examples and methods are to be considered as illustrative and not restrictive, and the invention is not to be limited to the details given herein, but may be modified within the scope of the appended claims.

What is claimed is:

1. An optical link for transmission of an RF signal using an optical fiber having opposing ends such that unwanted distortion signals are produced between said opposing ends when optical signals pass through the optical fiber, said optical link comprising:

at least two light sources which emit first and second optical carriers at first and second optical wavelengths, respectively;

a combiner for combining the first and second optical carriers into a combined optical signal;

a modulator for modulating the combined optical signal using the RF signal, and an for producing first and second optical signals, such that each of the first and second optical signals includes a portion of the first and second optical carriers and said RF signal in a way which produces a predetermined relationship between the first and second optical signals;

transmission means for selectively multiplexing certain portions of the first and second optical signals to produce a multiplexed signal and for introducing the multiplexed signal into one end of said optical fiber; and receiving means, at the opposing end of said optical fiber, for receiving the multiplexed signal including said unwanted distortion signals produced during transmission through said optical fiber and for recovering from the received multiplexed signal said first optical carrier affected by said unwanted distortion signals and having said RF signal modulated thereon and said second optical carrier affected by said unwanted distortion signals and having said RF signal modulated thereon and, thereafter, for using the modulated RF signals including said unwanted distortion signals obtained from the modulated first and second optical carriers in a way which re-generates the RF signal based on said predetermined relationship while causing said distortion signals to be canceled.

2. The optical link of claim 1, wherein said combiner includes a polarization-maintaining combiner which combines the first and second optical carriers for use in producing the first and second optical signals.

3. The optical link of claim 2, wherein said modulator includes a Mach Zehnder modulator for modulating the RF signal onto the combined first and second optical carriers and for producing the first and second optical signals in a way which produces said predetermined relationship between the first and second optical signals.

4. The optical link of claim 1, wherein said predetermined relationship between the first and second optical signals is a phase relationship, such that the modulated RF signal on the first optical carrier is 180° out of phase with respect to the modulated RF signal on the second optical carrier; and wherein the modulated RF signals obtained from the first and second optical signals are combined by said using an additional 180° phase shift such that the modulated RF signal from the first optical carrier adds with the modulated RF signal from the second optical carrier while the additional 180° phase shift causes the distortion signals from the first and second optical carriers to cancel.

5. The optical link of claim 4, wherein said transmission means includes a wavelength-division multiplexer having first and second input channels and an output channel, wherein said wavelength division multiplexer extracts the first optical carrier as the certain portion from the first optical signal at the first input channel, and extracts the second optical carrier as the certain portion from said second optical signal at the second input channel, such that said multiplexed signal at the output channel contains only the first and second optical carriers having said predetermined phase relationship.

6. The optical link of claim 1, wherein said predetermined relationship between the first and second optical signals is a phase relationship such that the modulated RF signal on the first optical carrier is 180° out of phase with respect to the modulated RF signal on the second optical carrier; and wherein said receiving means includes a demultiplexer for separating the first and second optical carriers from said multiplexed signal into first and second optical output signals such that the first optical output signal includes said first optical carrier and the second optical output signal includes said second optical carrier, while maintaining the phase relationship between the modulated RF signals forming part of each of said first and second optical carriers within the first and second optical output signals.

7. The optical link of claim 6 wherein said receiving means includes means for converting the modulated RF signals forming part of said first and second optical output signals into first and second RF output signals, while preserving the phase relationship between the modulated RF signals, and wherein the modulated RF signals are combined using combining means for inverting the phase of one of the modulated RF signals and adding the inverted modulated RF signal to the other one of the modulated RF signals.

8. The optical link of claim 7 wherein said receiving means includes a phase compensator configured for introducing an additional 180° phase shift to the modulated RF signal on one of said optical output signals such that the modulated RF output from one of the optical output signals is brought into phase with the other one of said optical output signals while said unwanted distortion signals on one of the optical output signals is forced substantially out of phase with respect to said unwanted distortion signal on the other one of said optical output signals.

9. A method of transmitting an RF signal using an optical fiber having opposing ends such that unwanted distortion signals are at least produced between said opposing ends when optical signals pass through the fiber, said method comprising the steps of:

a) emitting first and second optical carriers at different optical wavelengths;

b) combining the first and second optical carriers into a combined optical single;

c) modulating the combined optical signal using the RF signal forming a modulated combined optical signal;

d) producing first and second optical signals from the modulated combined optical signal in a way which provides a predetermined relationship between the first and second optical signals, so that each of the first and second optical signals includes at least a portion of the first and second optical carriers and said RF signal modulated thereon;

e) selectively multiplexing certain portions of the first and second optical signals to produce a multiplexed signal, and then introducing the multiplexed signal into one end of said optical fiber;

f) receiving the multiplexed signal at an opposing end of said optical fiber, including said unwanted distortion signals produced during transmission through said optical fiber; and g) at the opposing end of said fiber, recovering from the multiplexed signal said first optical carrier having said RF signal modulated thereon as affected by said unwanted distortion signals and said second optical carrier having said RF signal modulated thereon as affected by said unwanted distortion signals, and, thereafter, using the modulated RF signals obtained from the first and second optical carriers in a way which re-generates the RF signal based on said predetermined relationship while causing said distortion signals to be canceled.

10. The method of claim 9, wherein said first and second optical carriers include first and second polarization states, respectively, and wherein step b) includes combining the first and second optical carriers in a way which maintains said first and second polarization states for use in producing the first and second optical signals.

11. The method of claim 9, wherein said certain portions of said first and second optical signals include a phase relationship such that the modulated RF signal on the first optical carrier is 180° out of phase with respect to the modulated RF signal on the second optical carrier, and wherein step (g) includes recovering the modulated RF signals from the first and second optical carriers, introducing an additional 180° phase shift to the recovered RF signal obtained from the first or second optical carrier to produce an inverted recovered RF signal, and adding the inverted recovered RF signal to the other recovered RF signal such that the additional 180° phase shift causes the unwanted distortion signals to cancel.

12. The method of claim 9, wherein certain portions of the first and second optical signals are multiplexed by: i) extracting the first optical carrier from the first optical signal, including said RF signal modulated thereon, to reject the second optical carrier, ii) extracting the second optical carrier from the second optical signal, including said RF signal modulated thereon, to reject the first optical carrier, and, iii) combining the extracted first and second optical carriers to produce said multiplexed signal while preserving said predetermined relationship.

13. The method of claim 12, wherein step (d) includes inducing a phase difference of 180° between the RF signal modulated on the first optical carrier and the RF signal modulated on the second optical carrier as the predetermined relationship between the first and second optical signals.

14. The method of claim 13, wherein step (f) includes separating the first and second optical carriers from said multiplexed signal into first and second optical output signals, such that the first optical output signal includes said first optical carrier as affected by said unwanted distortion signals and the second optical output signal includes said second optical carrier as affected by said unwanted distortion signals, while maintaining the phase relationship between the modulated RF signals on said first and second optical carriers in the first and second optical output signals.

15. The method of claim 14, wherein step (g) includes converting said first and second optical output signals into first and second RF output signals; and wherein said predetermined phase relationship is preserved between the first and second RF output signals, at least in part, using a phase compensation step which brings the first and second RF outputs substantially into phase while said unwanted distortion signals on said first and second optical output signals, produced during transmission through said optical fiber, are forced substantially out of phase.

16. A method of transmitting an RF signal using a wavelength division multiplexer including first and second input ports matched to first and second optical wavelengths, respectively, and an output port, and further using an optical fiber having opposing ends such that unwanted distortion signals are at least produced between said opposing ends when optical signals pass through the fiber, said method comprising the steps of:

a) emitting first and second optical carriers having said first and second optical wavelengths, respectively;

b) combining the first and second optical carriers into a combined optical signal;

c) modulating the combined optical signal using the RF signal forming a modulated combined optical signal;

d) producing first and second optical signals from the modulated combined optical signal in a way which provides a predetermined relationship between the first and second optical signals and so that each of the first and second optical signals includes at least a portion of the first and second optical carriers having said RF signal modulated thereon;

e) selectively multiplexing certain portions of the first and second optical signals using said wavelength division multiplexer to produce a multiplexed signal and then introducing the multiplexed signal from the wavelength division multiplexer into one end of said optical fiber;

f) at the opposing end of said fiber, receiving and recovering said first optical carrier having said RF signal modulated thereon as affected by the unwanted distortion signals and said second optical carrier having said RF signal modulated thereon as affected by the unwanted distortion signals;

g) removing the modulated RF signals from the modulated first and second optical carriers while preserving said predetermined relationship; and h) combining the modulated RF signals in a way which regenerates said RF signal based on said predetermined relationship while causing said distortion signals to be canceled.

17. The method of claim 16, wherein said step (e) includes using said wavelength division multiplexer to extract the first optical wavelength from the first optical signal at the first input port of said wavelength-division multiplexer so as to reject the second optical signal, and to extract the second optical wavelength from the second optical signal at the second input port of said wavelength-division multiplexer so as to reject the first optical signal, such that said multiplexed signal at the output port of said wavelength division multiplexer includes only the first optical wavelength from the first optical signal as affected by said unwanted distortion signals and the second optical wavelength from the second optical signal as affected by said unwanted distortion signals, each of which is modulated by said RF signal while preserving said predetermined relationship.

* * * * *

UNITED STATES PATENT AND TRADEMARK OFFICE
CERTIFICATE OF CORRECTION

PATENT NO. : 6,634,811 B1 Page 1 of 1
DATED : October 21, 2003
INVENTOR(S) : Gertel et al.

It is certified that error appears in the above-identified patent and that said Letters Patent is hereby corrected as shown below:

<u>Title page</u>,
Item [73], Assignee, should read -- JDS Uniphase Corporation --

<u>Column 6</u>,
Line 26, "combined by said using" should read -- combined by said receiving means using --

<u>Column 9</u>,
Line 10, "wherein said step (e)" should read -- wherein step (e) --

Signed and Sealed this

Eleventh Day of May, 2004

JON W. DUDAS
*Acting Director of the United States Patent and Trademark Office*